May 2, 1961 R. L. KINDRED 2,982,123
PROGRAMMING CIRCUIT FOR CHROMATOGRAPHIC ANALYZER
Filed Aug. 14, 1957 4 Sheets-Sheet 1
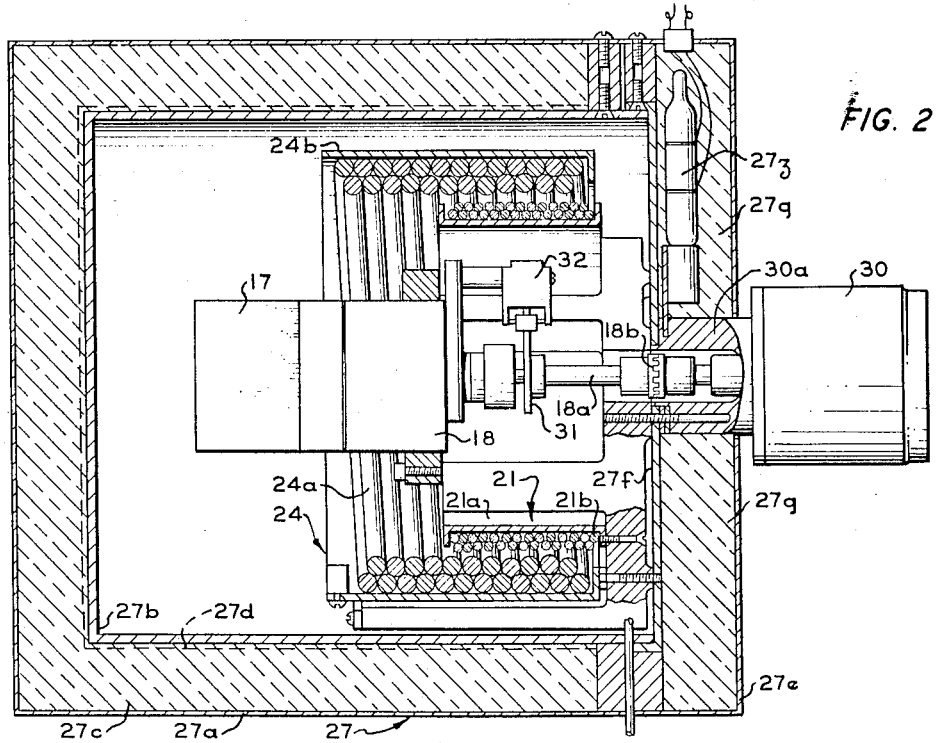
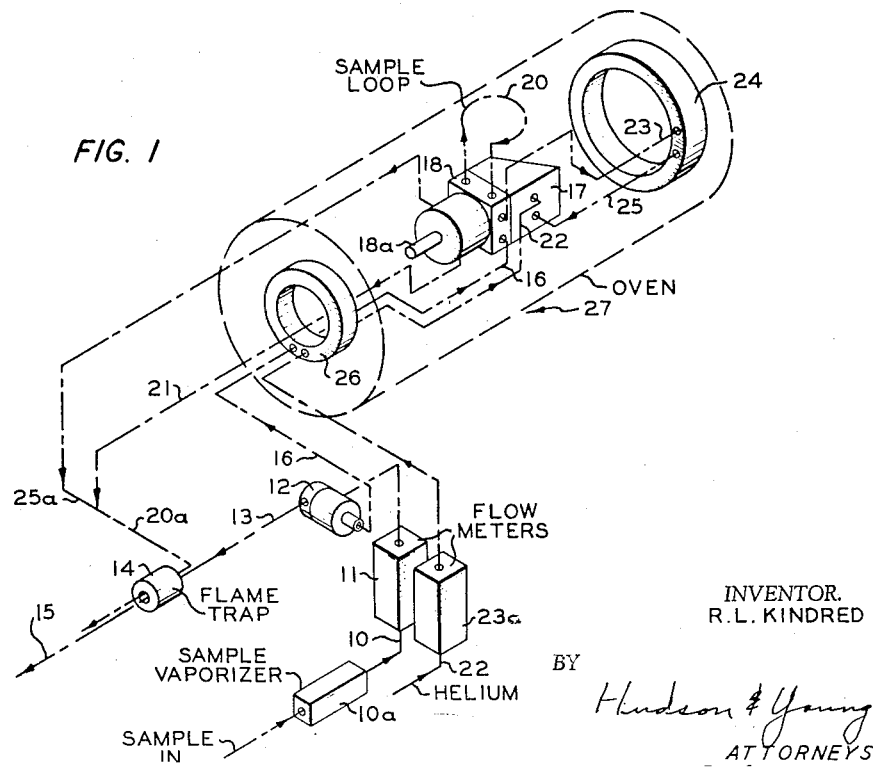
INVENTOR.
R. L. KINDRED
BY
Hudson & Young
ATTORNEYS May 2, 1961 R. L. KINDRED 2,982,123
PROGRAMMING CIRCUIT FOR CHROMATOGRAPHIC ANALYZER
Filed Aug. 14, 1957 4 Sheets-Sheet 2

INVENTOR.
R.L. KINDRED
BY Hudson & Young
ATTORNEYS

May 2, 1961  R. L. KINDRED  2,982,123
PROGRAMMING CIRCUIT FOR CHROMATOGRAPHIC ANALYZER
Filed Aug. 14, 1957  4 Sheets-Sheet 3

INVENTOR.
R.L. KINDRED
BY
Hudson & Young
ATTORNEYS

May 2, 1961 R. L. KINDRED 2,982,123
PROGRAMMING CIRCUIT FOR CHROMATOGRAPHIC ANALYZER
Filed Aug. 14, 1957 4 Sheets-Sheet 4
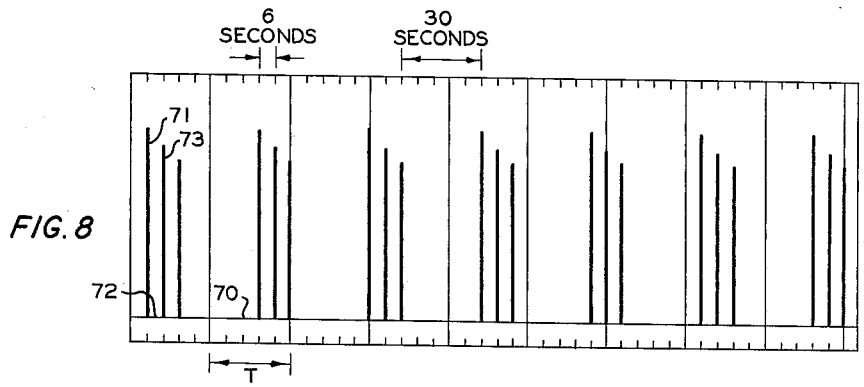
FIG. 8
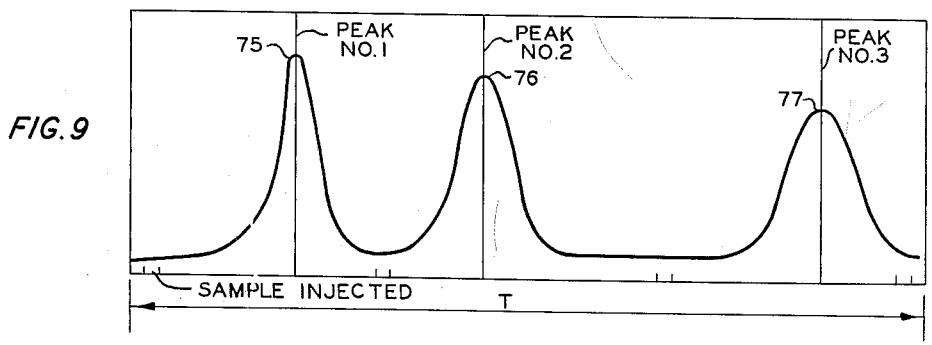
FIG. 9
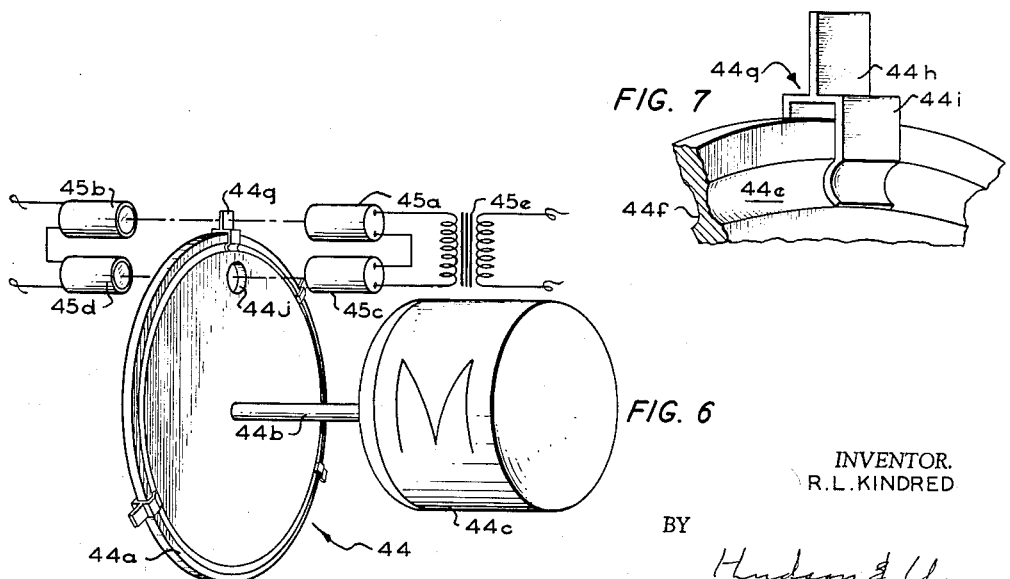
FIG. 7
FIG. 6
INVENTOR.
R.L. KINDRED
BY
Hudson & Young
ATTORNEYS

United States Patent Office 2,982,123
Patented May 2, 1961

2,982,123

PROGRAMMING CIRCUIT FOR CHROMATOGRAPHIC ANALYZER

Raymond L. Kindred, Bartlesville, Okla., assignor to Phillips Petroleum Company, a corporation of Delaware Filed Aug. 14, 1957, Ser. No. 678,059

4 Claims. (Cl. 73—23)

This invention relates to a programming circuit for chromatographic analyzer.

In analyzing a sample by gas chromatography, the sample is passed through a tube containing a suitable sorptive material, such as coconut charcoal, crushed fire brick impregnated with a silicone oil or dimethyl sulfolane, molecular sieve material or the like, by the use of a carrier gas. As the carrier gas continuously sweeps through the tube, continuous sorption and desorption take place within the column, and the various components of the sample appear, in succession, in the effluent from the column. The first component to appear is, of course, the least readily sorbed, and additional components appear thereafter in increasing order of affinity for the material in the column. Depending upon the nature of the sample, the time at which components appear in the effluent varies considerably.

The amount of such component is indicated by a sensing device, such as a thermal conductivity bridge, and the signal produced responsive to the more abundant components has a considerably higher peak amplitude than the signal produced by the components present in small or trace amounts.

In accordance with this invention, a programming circuit is provided which permits repeated analyses of gas samples having approximately the same composition. The circuit includes timing mechanism to automatically open and close the valves in the sample inlet and carrier gas inlet lines, and to periodically inject measured volumes of sample into the chromatographic column. As the various components issue from the column during each analysis period, a separate, independently adjustable impedance is connected into the recorder circuit, thus adjusting the recorder sensitivity so that the recording for each component has adequate height on the chart. Also the recorder drive mechanism and input circuit are so controlled that a convenient bar-type graph is produced by the recorder, a bar being produced for each component having a height proportional to the concentration of that component in the sample. Further, the bars thus produced for each separate analysis are segregated into groups separated by relatively wide spaces on the recorder chart so that different samples can be readily distinguished upon the recording medium.

Accordingly, it is an object of the invention to provide an improved programming circuit for a chromatographic analyzer.

It is a further object to improve the manner in which signals are displayed on a recording chart in response to the gas chromatography analysis.

It is a still further object to provide a bar graph representation of the sample analysis.

It is a still further object to vary the sensitivity of the recorder circuit according to the concentration of each component present in the sample.

It is a still further object to provide a programming circuit which is reliable in operation, and produces results which are readily intelligible even to an untrained operator.

Various other objects, advantages and features of the invention will become apparent from the following detailed description taken in conjunction with the accompanying drawings in which:

Figure 1 is a schematic flow diagram of the chromatographic analyzer of the invention;

Figure 2 is a vertical, sectional view, partly in elevation, of the chromatographic column assembly;

Figure 6 is a perspective view of the timing mechanism;

Figure 7 is a detail view of the timing disc and tab;

Figure 8 is a view of a chart in bar graph form; and

Figure 9 is a view of a chromatogram with a modified programming system.

Figure 4:
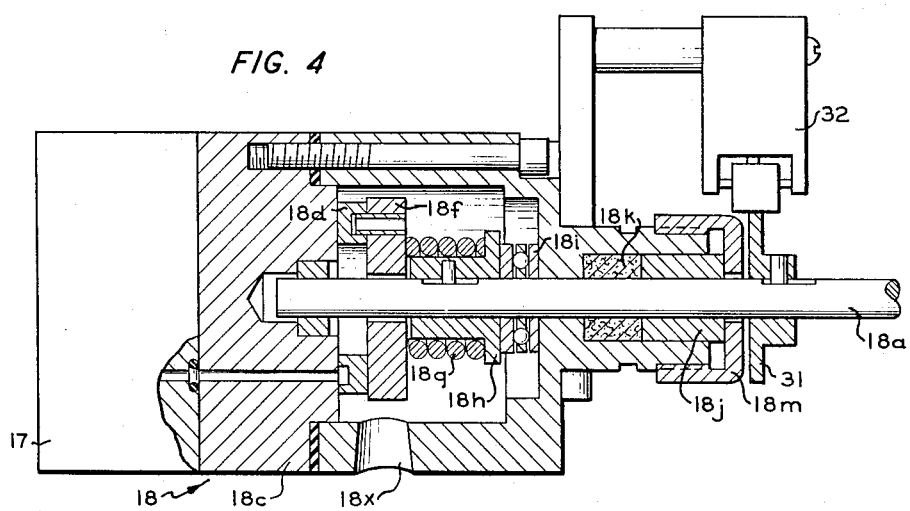
Figure 4 is a vertical, sectional view, partly in elevation, of the sample valve.

Referring now to the drawings in detail, and particularly to Figure 1, the sample to be analyzed is fed into the instrument by a conduit 10 which leads through a flow meter 11 to a three-way solenoid valve 12. If the sample is liquid, it is vaporized in a unit 10a under fixed conditions of temperature and pressure. This increases its volume per unit weight, thus simplifying volume measurement. If the vaporization temperature is high, all parts of the system have to be at a high temperature to avoid condensation. This is avoided in the present apparatus by operating the system at reduced pressure, such that the partial pressure of the highest boiling component present is not exceeded. This can be accomplished by a vacuum pump and a pressure recorder controller 10b, Figure 3. In one position, the valve 12, Figure 1, discharges the sample through a line 13 and a flame trap 14 to a flare pipe 15. With the valve in its other position, the sample passes through a line 16 to a rotary valve 18 controlled by a motor, not shown, at the end of a shaft 18a.

From the valve 18, the sample may be directed into a sample loop 20, or, alternatively, it may be discharged through a line 20a and the flame arrester 14 to the vent 15.

A supply of carrier gas, such as helium, is introduced to the instrument by a line 22, this gas passing through a flow meter 23a, and one cell of a thermal conductivity measuring assembly 17 to the valve 18. From the valve 18, the gas may be passed through the loop 20 to a line 23 which leads to a chromatographic column 24, the material leaving the column passing through a line 25 and another thermal conductivity cell of the assembly 17 to a vent conduit 25a communicating with the line 20a.

It will be noted that the inlet lines 16 and 22 pass through a preheater coil 26 so that they are at the same temperature when they pass through the column and thermal conductivity cell assembly. As will be hereinafter explained in greater detail, the parts 17, 18, 24 and 26 are mounted within a thermally shielded cover 27 which is accurately maintained at a constant temperature.

In operation, valve 18 is first actuated to pass sample material through the loop 20 to the vent pipe while the helium gas passes through the column 24. Thereafter, the solenoid valve 12 is actuated to close off the line 16 and pass the sample to the vent pipe 13. As a result, a portion of the sample to be analyzed is trapped within the loop 20 at atmospheric pressure. The valve 18 is now actuated to pass the helium gas through the loop 20 and, thence, into the column 24, thereby pushing the sample material ahead of it through the column. In this manner, a definite predetermined amount of sample material is passed through the column at each operation, the effect of pressure variations being eliminated by the described operation of the solenoid valve 12. This provides precise volume reproducibility of the sample.

The helium carrier gas entering the column passes through one cell of the thermal conductivity assembly 17 while the carrier and sample leaving the column pass through the other cell of this assembly. As a result, as the separated components of the sample are eluted from the column 24 in succession, the resulting conductivity changes in the sample cell produce an unbalance voltage in a bridge circuit to be hereinafter described. This voltage varies in accordance with the nature and amount of each different component in the sample and thus permits it to be analyzed as to its composition. It will be understood that lighter materials, such as methane, ethane and the like, will be the first to leave the chromatographic column 24 and thereafter the heavier components will leave the column, there being a definite break or change in thermal conductivity as the nature of the component leaving the column changes. This enables the composition of the sample to be accurately determined by measuring the difference in thermal conductivity between (a) pure helium, and (b) helium plus the component being analyzed.

Referring now to Figure 2, it will be noted that the cover 27 includes an outer metal shell 27a, and an inner metal shell 27b, the space between these shells being filled with a suitable insulating material 27c, such as fiber glass. A heater 27d is wound exteriorly of the shell 27b, and this heater is thermostatically controlled by a mercury thermostat 27z and a conventional thyratron circuit, not shown, to maintain a constant predetermined temperature within the unit. The assembly is provided with a cover, consisting of an outer plate 27e, an inner plate 27f, and a layer 27g of insulating material, such as fiber glass, between these plates.

Attached to the plate 27f, and mounted interiorly of the shell is the preheater assembly 21 which includes an annular support 21a having coils 21b wound around it which form a part of the respective lines 16 and 22, Figure 1.

Mounted concentrically with respect to the assembly 21 is the chromatographic column assembly 24 which includes a coil 24a filled with absorptive material, such as activated charcoal, silica gel, molecular sieve material or the like, this coil being wound interiorly of an annular member 24b.

The cell assembly 17, valve assembly 18, and related parts are mounted axially of the coils 24a and 21b, the valve having an outwardly protruding shaft 18a which is secured by a coupling 18b to an electric motor 30 having an annular mounting piece 30a. The motor is thus mounted outside the housing 27.

Also attached to the shaft 18a is a cam 31 which actuates a micro-switch 32 connected to the motor 30 to the end that the valve is rotated a predetermined distance each time current is supplied to the motor.

It will be evident that the housing thus provided for the thermal conductivity cells, valve assembly and chromatographic column is maintained accurately at a predetermined temperature while the analysis is being carried out. Also, by virtue of the preheater coil 21b, the sample and displacement gas streams are effectively brought to the interior temperature of the housing before they enter the analysis coil. Excellent heat transfer is obtained between the parts due to mounting of the valve 18 next to the assembly 17 with resultant elimination of several conduits which would otherwise be required. Finally, a very compact and rugged structure is provided which is capable of withstanding hard usage.

Figure 3:
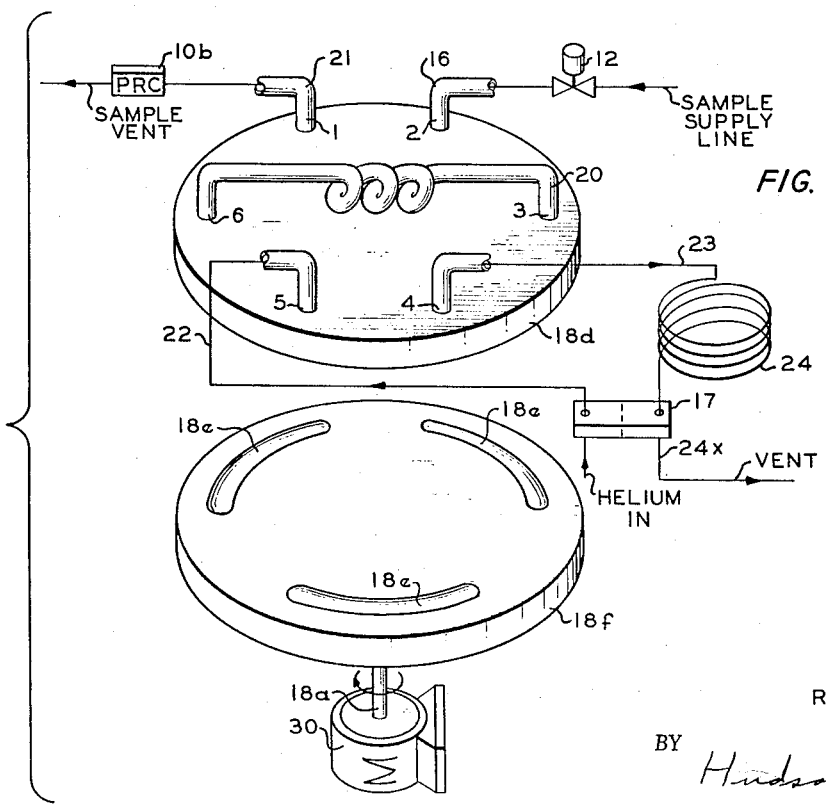
Figure 3 is a perspective view of the sample valve with the parts in disassembled relation.

The structure of the valve assembly 18 is shown in more detail by Figures 3 and 4. It will be noted that the valve has a base 18c which is secured to the cell assembly 17. A plurality of ports are included in a valve ring 18d, and these ports are interconnected by grooves 18e formed in a back-up ring 18f. The ring 18f can be rotated by the shaft 18a. It is connected thereto by a spring 18g and a spring follower-coupler member 18h. Also cooperating with the shaft 18a are a thrust bearing 18i, a bushing 18j, a packing 18k and a packing nut 18m. It will be noted that the shaft carries the cam 31 and microswitch 32 described in connection with Figure 2.

The ring 18f has two positions relative to the valve seat 18d, and the ports in the valve seat 18d are connected, respectively, to the vent line 21, the sample supply line 16, one end of the sample loop 20, the inlet line 23 to the chromatographic column 24, the helium inlet line 22, and the other end of the sample loop 20.

In the first position, the slots 18e are so disposed as to connect the sample line 16 to the vent line 21 through the loop 20, while the column inlet is connected to the helium inlet line 22. As a result, the sample material flows through the loop 20 while helium or other carrier gas flows through the chromatographic column.

In the second rotary position of the ring 18e, displaced 60° from the first position, the slots 18e are so disposed that helium gas passes through the line 22, the sample loop 20, and the line 23 to the column 24 while the sample supply line is connected to the vent pipe 21. Accordingly, the sample is vented, while the helium gas displaces the sample trapped in the loop 20 and forces it to the column 24 where it is analyzed in the manner previously described.

As previously indicated, the solenoid valve 12, Figure 1, closes a short time before the sampling valve 18 is moved to its second position, with the result that the sample pressure drops to atmospheric pressure before the sample trapped in the loop is fed to the chromatographic column. This prevents variations in pressure and, hence, in the amount of sample flowing to the column during each cycle of operation. As will hereafter become apparent, this valve is actuated automatically as the analyses are carried out.

It is a feature of the invention that the helium gas leaving the column 24 is utilized as a purge gas for the valve housing 18. Thus, this gas passes from the column outlet 24x to the interior of the housing 18 by a bore, not shown, and leaves the housing through a bore 18x. Since this gas is essentially inert, a combustible mixture cannot form in the housing 18 should leakage at the valve ports occur.

Figure 5:
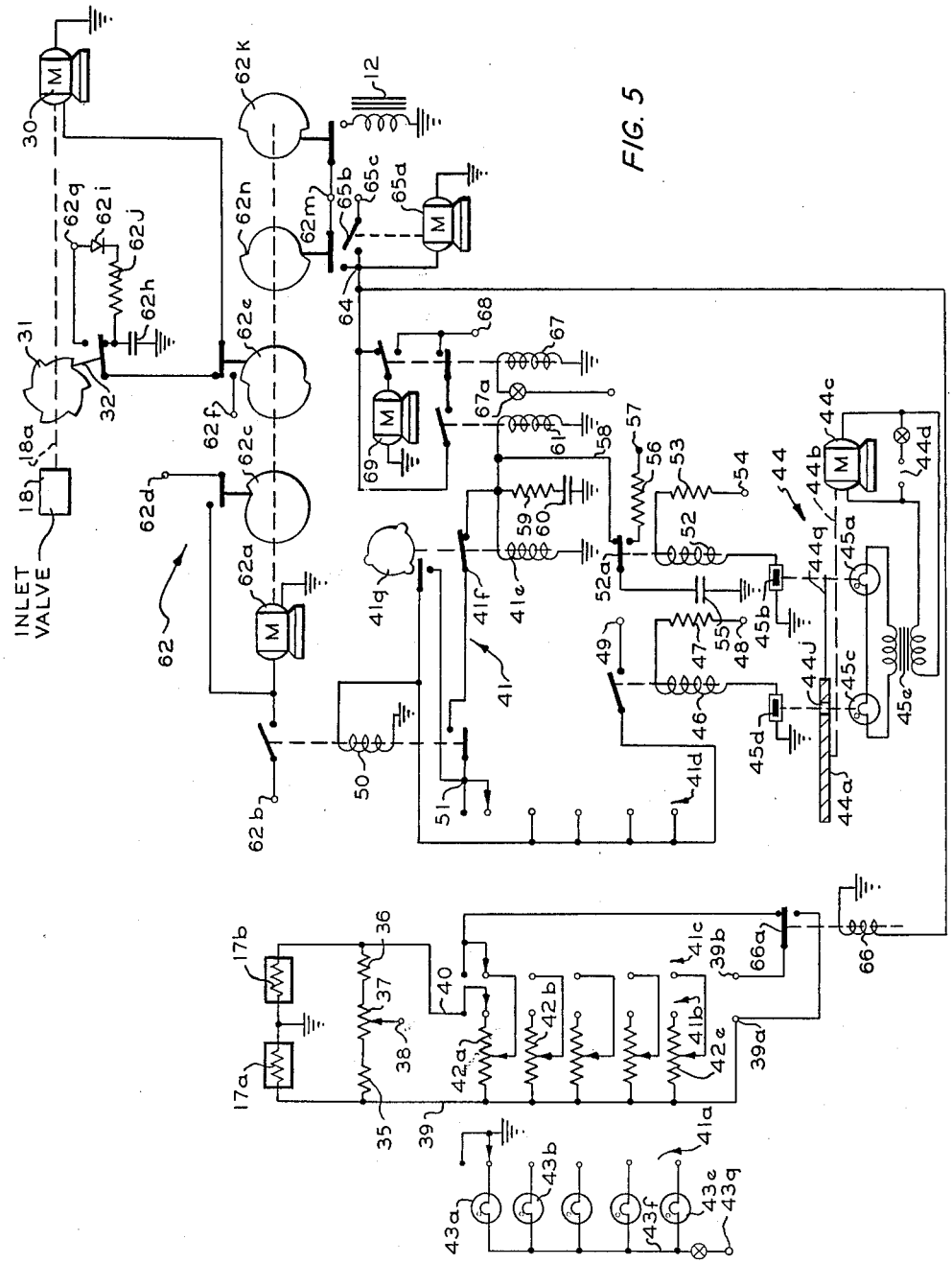
Figure 5 is a schematic circuit diagram of the timing and programming system.

In Figure 5, there is shown a detailed electrical circuit of a programmer which separates portions of a recording into different sections corresponding to the various components of the sample as they issue from the outlet of the chromatographic column 24. This programming circuit adjusts the sensitivity of the recorder circuit for each individual component, and may be adjusted to provide a bar graph type of recorder output. The circuit is desirably mounted in an air-purged control box. All open switch contacts are mounted in an explosion-proof bell attached to this air-purged control box, and all switches in the control box are mercury switches.

To this end, two thermal conductivity cells 17a and 17b, forming a part of the assembly 17, are connected in a Wheatstone bridge circuit with fixed resistances 35, 36 and a potentiometer 37, the contactor of which is connected to a positive power supply terminal 38. It will be recalled that one of these cells is exposed to the incoming helium gas while the other cell is exposed to the effluent from the column 24, Figure 1. Thus, the bridge produces an output voltage across conductors 39 and 40, Figure 5, representative of the difference in thermal conductivity between (a) helium and (b) helium plus the particular component passing out of the column. The output voltage of the bridge is varied before being applied to the input terminals 39a, 39b of a suitable recorder for two reasons. First, it is desired to adjust the outputs to a desired percentage for full scale recorder reading, and second an adjustment is necessary to compensate for peak height differences for several components of the same percentage since the concentration of a component is proportional to the area under the peak shown by the recorder for that particular component, and the peaks are not all the same widths for various components.

To this end, a selector switch 41 is provided having four banks 41a to 41d of contacts, a stepping coil 41e, a set of interrupter contacts 41f and a set of off-normal contacts 41g. A series 42a to 42e of potentiometers have their fixed terminals connected to the conductor 39 and to the respective contacts of the switch bank 41b. The contactors of these potentiometers are connected, respectively, to the terminals of switch bank 41c.

Normally, one potentiometer 42 is provided for each component of the sample stream which is to be analyzed. The selector switch operates, as hereafter described, to switch the appropriate one of the potentiometers into the circuit as the sample mixture is resolved into its components. In this manner, the potentiometers can be set during calibration with a sample generally similar to the ones to be analyzed to present a preselected percentage of a component as full scale on the recorder. Then, the recorder will not go offscale during analysis, but an adequate height is obtained for the recording peak of each component of the sample under analysis.

A bank 43a to 43e of indicator lamps is provided to show which component of the sample is being analyzed. One terminal of each lamp is connected to a lead 43f which extends through a switch to an A.C. supply terminal 43g while the other terminals of the lamps are connected to the respective contacts of the switch bank 41a, the movable contact of which is returned to the other side of the line.

The operation of the programming circuit is controlled by a disc timing device of novel construction and operation. Referring to Figures 5, 6 and 7, this unit, which is generally indicated by reference numeral 44, includes a timing disc 44a fixed to a shaft 44b of a motor 44c. The motor, in turn, is connected by a switch to supply terminals 44d, Figure 5.

Complementary slots 44e and 44f are formed in opposite faces of the disc adjacent the edge thereof. Any desired number of tabs 44g can be mounted at desired locations along the edge of the disc. Each of these has an outwardly protruding tab portion 44h, Figure 7, formed integrally with a pair of spring fingers 44i. These fingers fit into the slots 44e, 44f and hold the tabs in desired position at the edge of the disc. The disc further has one or more openings 44j formed therein near its edge.

The tabs 44g are arranged to interrupt a beam of light passing from a lamp 45a to a photoelectric cell 45b. The opening 44j is arranged to pass a beam of light from a lamp 45c to a photoelectric cell 45d when the disc reaches a predetermined angular position. The lamps 45a, 45c are connected in series with the secondary winding of a transformer 45e, Figure 5, the primary winding of which is connected to the voltage source 44d.

In operation, it will be evident that the tabs 44g interrupt the beam of light passing to the cell 45b any desired number of times during each revolution of the disc, and at any desired angular positions of the disc. Moreover, the number of interruptions and their angular positions can be readily varied merely by removing tabs from the disc and placing other tabs thereon at the desired angular positions. The openings 44j provide a pulse of light to the cell 45d at any desired angular position of the disc, for example, for reset purposes.

The tabs 44g may thus be regarded as pulse-producing devices which interrupt light from the source 45a to the sensing device 45b. It will be evident that this provides a very flexible timing mechanism having obvious utility where pulses of variable timing and width are to be produced in a cyclic manner. In the present system, the tabs are used to provide a predetermined length for the analysis period of each component of the sample, the less volatile components of the sample, of course, requiring more time to pass through the chromatographic column than the more volatile components. As will become evident later, the opening 44j provides an index pulse which repeats the sequence of analysis operation.

This disc timing system is highly advantageous in that it provides improved resolution, accuracy and flexibility compared to cam timers, in addition to eliminating the problem of cam wear.

The photoelectric cells 45b and 45d control the impulsing circuits of the selector switch 41. To this end, one terminal of the cell 45d is grounded, the other terminal being connected through the operating winding of a relay 46 and a fixed resistance 47 to a positive supply terminal 48. The relay 46 has a set of normally open contacts which are connected in circuit with a positive supply terminal 49 and all contacts except the first of a reset bank 41d of the selector switch. This reset bank is further connected to ground through the operating winding of a relay 50, and through the off-normal contacts 41g to a terminal 51 connected to the arm of the switch bank 41d. The wiper connected to terminal 51 wipes by the bank contact also attached to the terminal 51. This is also true of the wipers of the other banks of the selector switch and the bank contacts connected thereto.

One terminal of the photoelectric cell 45b is connected to ground, and the other terminal is connected through the operating winding of a relay 52 and a fixed resistance 53 to a positive supply terminal 54. The relay 52 has an arm 52a which is connected to ground through a condenser 55. This arm coacts with a normally open contact which is connected by a fixed resistance 56 to a positive supply terminal 57, and the arm further coacts with a normally closed contact having a lead 58 secured thereto, which lead is connected to ground through the stepping coil 41e of the selector switch. The latter coil is connected in parallel with a unit including a fixed resistance 59 in series with a condenser 60. The lead 58 is further connected to ground through the operating winding of a relay 61 and to the terminal 51 through the interrupter contacts 41f of the selector switch and a normally open contact set of the relay 50.

In operation, the photoelectric cell 45b is energized at all times when a tab 44g is not positioned between it and the lamp 45a. Accordingly, the relay 52 is energized and condenser 55 is charged. When a tab 44g passes between the source 45a and the cell 45b, a pulse of current passes from the condenser 55 to the coil 41e, thus causing the switch to advance one step. For a purpose to be explained later, the relay 61 is also momentarily energized by each such pulse. Thus, each tab causes the switch to be advanced one step causing a new potentiometer 42 to be inserted in circuit with the cells 17a, 17b and a new indicator lamp 43 to be energized. The timed periods thus provided correspond with the times required to analyze for various components of the sample passing to the chomatographic column.

The photoelectric cell 45d is normally de-energized, but provides current when the opening 44j passes between the lamp 45c and the cell 45d. When this occurs, power is applied to the reset bank 41d and relay 50 is energized. This causes current to flow to the terminal 51 and, thence, to the stepping coil 41e through the contacts 41f and the normally open contacts of relay 50 until the switch reaches its normal position in engagement with the first bank contact. The off-normal contacts 41g close only as the wiper goes by its own terminal. Otherwise, the wiper would home on its own connecting terminal instead of the first bank contact. As will be explained later, when the selector switch is reset in the manner just described, a new series of analytical operations is initiated.

Each time a new cycle of operation is initiated by the described energization of the photoelectric cell 45d, the relay 50 is energized, thus supplying current through a normally-open contact set to a motor 62a from a supply terminal 62b. These are elements of a timer 62 which has a cam 62c controlling a holding circuit to the motor from a supply terminal 62d to the end that the timer motor operates through a complete revolution despite opening of the contacts of relay 50.

The timer further includes a cam 62e which supplies current from a terminal 62f twice during each cycle of the timer 62 to the motor 30, Figures 2 and 5. When thus energized, the motor effects a 60° revolution of the valve 18 and rotates the cam 31 fixed to the shaft 18a. The initial movement of this cam completes a holding circuit from a supply terminal 62g through normally open contacts of the microswitch 32 and the normally closed contacts actuated by the cam 62e.

A condenser 62h is charged from the terminal 62g by a rectifier 62i and a fixed resistance 62j. When the valve motor completes its 60° revolution, the microswitch 32 is actuated to interrupt the motor holding circuit. At the same time, condenser 62h discharges through the normally closed contacts of the microswitch 32 and the normally closed contacts actuated by the cam 62e. This discharge of the condenser abruptly stops the motor and prevents overtraveling of the valve.

A cam 62k forming a part of the timer actuates the solenoid valve 12, Figures 1 and 5, from a terminal 62m so that this solenoid valve closes off the flow of sample a short time before the valve 18 is actuated to pass sample from the loop 20 into the chromatographic column 24. In some cases, this valve may be operated pneumatically rather than electrically, as shown.

It will be apparent, therefore, that the timer 62 actuates the valve 18 in the manner previously explained in timed relation to the operation of the solenoid valve 12.

It is a feature of the invention that the present programming circuit is adapted to produce a bar graph display upon the recorder chart, as illustrated by Figure 8. To this end, a cam 62n forming a part of the timer 62 supplies current, when actuated, to a terminal 64. This, in turn, energizes a timer motor 65a which closes a set of contacts 65b connecting the terminal 64 to a supply point 65c. At each actuation, the timer 65 supplies current to the terminal 64 for a timed period.

The terminal 64 is further connected to the winding of a relay 66 having contacts 66a which short-circuit the recorder input terminals 39a, 39b when the relay is actuated. When the relay is de-energized, the recorder input terminals are connected through the potentiometers 42 and bank contacts 41b and 41c to the thermal conductivity bridge.

The terminal 64 is further connected through a normally open contact set of a relay 61 and through a normally closed contact set of a relay 67 to a supply terminal 68. Finally, the terminal 64 is connected through a normally closed contact set of the relay 67 to a chart motor 69.

When the terminal 64 is supplied with current by the cam 62n, the recorder terminals are short-circuited and the chart motor 69 is driven for a length of time determined by the length of the rise of the cam 62n. Also, when the contacts of cam 62n are open, the recorder contacts are short-circuited and the chart motor driven for a shorter period of time, determined by the setting of the timer 65. This occurs each time the relay 61 is energized along with the stepping coil 41e through de-energization of the relay 52 by passage of a tab 44g between the lamp 45a and photoelectric cell 45b.

When the relay 67 is energized manually by operation of a switch 67a, the chart motor is driven in the conventional manner directly from the voltage source 68.

In the over-all operation of the system, a sample having approximately the same components as the one to be analyzed is manually passed through the system, and the times required for each component to be successively eluted from the chromatographic column are determined. This enables the tabs to be set upon the disc timer, Figure 6, to provide the required intervals for the analysis of the respective components of the sample. The potentiometers 42 are set to give the desired full scale percentages for the respective components to be analyzed. The analyzer is then ready for operation, when a sample to be analyzed and helium gas are supplied to the equipment.

Assuming that a bar graph display, Figure 8, is desired, the relay 67 is de-energized, and rotation of the timer disc 44a is initiated by manipulation of the switch connected to terminals 44d, Figure 5.

With the operation thus initiated, the opening 44j passes between the lamp 45c and photoelectric cell 45d. This supplies power to the reset bank of the switch 41 causing it to return to its first position. At the same time, the timer 62 is energized.

During the first part of the cycle of timer 62, the sample valve 18, Figure 1, is so positioned that sample material traverses the loop 20 and the helium carrier gas is fed through the column 24. During this interval, the chart motor 69 is running and the recorder input terminals are short-circuited through supply of power to the terminal 64 from the contacts of the cam 62n. This produces the initial straight portion of the bar graph display denoted by reference numeral 70, Figure 8.

After a period sufficiently long to allow the loop 20, Figure 1, to become filled with the new sample, the solenoid valve 12 is actuated by the cam 62k, Figure 5, to stop the flow of sample through the line 16 and pass the sample to vent pipe 13. This allows the pressure within the loop to drop to atmospheric pressure for constant volume metering.

Thereupon, cam 62n opens the contacts associated therewith, thus interrupting the flow of current to the chart motor 69. The timer 65a continues to run as long as the contacts of the cam 62n are closed. The timer 65a will make 5 revolutions while the contacts of cam 62n are actuated. Both may release at the same time. It is preferable to have these contacts open slightly before the timer 65a has completed its 5th cycle. The effect of rotation of timer 65a will not show up on the recorder since the cam contacts 62 control the recorder during this interval.

The cam 62e next initiates a 60° rotation of the motor 30, thus causing the inlet valve 18, Figures 1 and 5, to move to a position where the sample is passed to the vent pipe, and the helium carrier gas is passed to the chromatographic cell 24 through the sample loop 20, thus pushing ahead of it the volume of sample trapped in the loop.

The most volatile component of the gas first issues from the column and passes through the thermal conductivity cell bridge 17. The potentiometer 42a has been previously adjusted to give a proper spread on the chart, based upon prior knowledge of the approximate composition of the sample. Recalling that the chart motor is stopped, it is evident that the pen of the recorder will trace a vertical line 71, Figure 8, upon the chart, the height of this line being representative of the concentration of the most volatile component of the sample.

At the end of the period allotted for analysis of the first component, a tab 44g, Figures 5 and 6, on the disc 44 interrupts the beam of light passing from the lamp 45a to the photoelectric cell 45b. The resulting deactuation of the relay 52 sends a pulse of current through the stepping coil 41e, Figure 5, of the selector switch and also closes the relay 61. The described energization of the stepping switch connects the potentiometer 42b in circuit with the thermal conductivity bridge and the recorder input terminals so that the proper recorder range is selected for the second most volatile component. Also, the pilot light 43b is energized signifying that analysis of the second component is taking place.

The described energization of the relay 61 energizes the timer 65 and causes the chart motor to run for a relatively short timed period. Also, relay 66 is energized to short-circuit the recorder input terminals. As a result a second horizontal line 72 is formed upon the recorder chart. Preferably and advantageously, the period represented by line 72, for example, 6 seconds, is substantially shorter than the period repersented by the line 70, for example, 30 seconds.

At the end of the cycle of the timer 65a, the contacts 65b are opened, thus de-energizing the chart motor. Also, the relay 66 is de-energized, thus connecting the recorder input terminals to the potentiometer and bridge circuit. The recorder pen then again traces a vertical line, the height of which represents the concentration of the second most volatile component of the sample. The potentiometer 42b has been previously adjusted to give an appreciable span for this component on the recorder chart.

This sequence of operation is repeated for each component of interest in the sample, the selector switch being successively actuated to place the proper potentiometer in the bridge circuit, light the appropriate indicator lamp 43, and disable the recorder input while the motor produces a short horizontal line 72 on the graph. Thus, the results of the analysis are presented in convenient bar graph form for ready interpretation.

It will be understood that the length of the total cycle can be varied by changing the speed of the motor 44c, Figures 5 and 6.

When the last component has been analyzed, the opening 44j, Figures 1 and 5, passes between the lamp 45c and photoelectric cell 45d. This resets the selector switch and again actuates the timer 62 to provide a relatively long line 70 between successive cycles. Thus, the lines on the chart are separated into easily readable groups, each representing one cycle of operation of the instrument, each group containing several lines representing the concentration of the respective components of the sample.

The instrument is also flexible in that the conventional form of graphic representation can be readily obtained. This is done by actuating the switch 67a, Figure 5, to energize the relay 67. Thereupon, current is applied continuously to the chart motor producing a record such as is shown by Figure 9 with peaks 75, 76 and 77 representing the concentrations of thet different components in the sample. Of course, the proper potentiometer 42 is insered for each component analyzed so that the proper spread upon the recorder chart is obtained.

Certain of the selector switch positions may be used, if desired, for automatic recorder zero, detector balance, and automatic recorder standardization wherein the quantity to be balanced or standardized is compared with a control value, and the difference utilized to vary an impedance so as to maintain the balanced or zero condition.

It will be apparent that the objects of the invention have been achieved in providing a chromatographic instrument which is of rigid construction and well adapted for use in hazardous locations. The output is presented in a form which can be readily analyzed, and the programming is automatically controlled so that the proper chart spread is obtained for each component. Also, the timing disc with the removable tabs permits the same instrument to be readily adjusted for analysis of sample streams of widely-varying composition. Finally, the sampling system, by allowing pressure to drop to atmospheric in the sample loop before the analysis cycle, prevents error which might result through pressure variations from one cycle to the next.

I claim:

1. A programming circuit for gas chromatography apparatus including a column filled with sorptive material, means for supplying a sample to the inlet of said column, a sensing device responsive to the amount of components of said sample present in the effluent from said column, and a recorder having a motor to advance a chart and an input circuit, said programming circuit comprising a plurality of impedances connected to the input circuit of said recorder, timing means arranged to produce a plurality of timing signals at preselected intervals of time each representing the time during which a selected component of the sample appears in the effluent of said column, means actuated by each timing signal to connect a different one of said impedances in circuit between the sensing device and the recorder input circuit, whereby the sensitivity of the recorder is adjusted according to the relative abundance of the components present in said sample, an auxiliary timer actuated by said timing signals, means connecting the motor of said recorder to said timer so that said motor is energized when the timer is actuated and is dee-energized when the timer is de-actuated, and means responsive to said timer to short-circuit the input circuit of said recorder during the interval when said timer is actuated, whereby a bar graph display is produced upon the recorder chart.

2. A programming circuit for gas chromatography apparatus including a column filled with sorptive material, means for supplying a sample to the inlet of said column, a sensing device responsive to the amount of components of said sample successively present in the effluent from said column, and a recorder having a motor to advance a chart and an input circuit, said programming circuit comprising a plurality of impedances connected to the input circuit of said recorder, timing means arranged to produce main timing signals followed by a plurality of subsidiary timing signa's at preselected intervals of time each representing the time during which a selected component of the sample appears in the effluent of said column, an auxiliary timer actuated by said subsidiary timing signals, means connecting the motor of said recorder to said timer so that said motor is energized when the timer is actuated and is de-energized when the timer is de-actuated, means responsive to said timer to short-circuit the input circuit of said recorder during the interval when said timer is actuated, whereby a bar graph display is produced upon the recorder chart, and means responsive to said main timing signals for short-circuiting the recorder input circuit and energizing the recorder motor for a longer period than the actuation period of said auxiliary timer.

3. A programming circuit for a chromatographic analyzer including a chromatographic column containing sorbent material, a sample inlet, a carrier gas inlet, a valve having a sample-collecting conduit secured thereto, a thermal conductivity assembly incorporating two thermal conductivity cells, means for passing the carrier gas through one cell and the effluent from said column through the other cell, a bridge circuit incorporating a voltage source, said thermal conductivity cells and a plurality of balancing impedances, and a recorder having a pair of input terminals and a chart motor, said programming circuit comprising, in combination, a selector switch having a reset contact bank, and a pair of auxiliary contact banks, timing mechanism arranged to produce a first control impulse during each of a plurality of analysis cycles and a p'urality of second control impulses at intervals of different lengths during each cycle, the length of said second control impulses corresponding to the time during which selected components of the sample appear in the effluent of said column, means for applying said first control impu'ses to the reset bank of said switch to return it to the first position, a timer actuated by energization of said reset bank to operate said valve so as to flow carrier gas through the column and sample through said collecting conduit, said timer being actuatable, after a timed period, to flow the carrier gas through said collecting conduit and thus displace the trapped sample into said column, said timer further being operable, during its cycle, to drive the recorder motor and short-circuit the recorder input terminals, means for feeding said second control impulses to said selector switch to cause the bank contacts to advance one step for each impulse, an auxiliary timer connected to said switch and actuated thereby to drive the chart motor and short-circuit the recorder input during each energization thereof, a plurality of variable impedances connected to the auxiliary bank contacts, and leads connecting said impedances in circuit with said bridge and the recorder input terminals so that a different impedance is connected in the bridge input circuit at each energization of the selector switch.

4. A programming circuit for a chromatographic analyzer including a chromatographic column containing sorbent material, a sample inlet, a carrier gas inlet, a valve having a sample-collecting conduit secured thereto, a thermal conductivity assembly incorporating two thermal conductivity cells, means for passing the carrier gas through one cell and the effluent from said column through the other cell, a bridge circuit incorporating a voltage source, said thermal conductivity cells and a plurality of balancing impedances, and a recorder having a pair of input terminals and a chart motor, said programming circuit comprising, in combination, a selector switch having a reset contact bank, and a pair of auxiliary contact banks, timing mechanism arranged to produce a first control impulse during each of a plurality of analysis cycles and a plurality of second control impulses at intervals of different lengths during each cycle, the length of said second control impulses corresponding to the time during which selected components of the sample appear in the effluent of said column, means for applying said first control impulses to the reset bank of said switch to return it to the first position, a timer actuated by energization of said reset bank to operate said valve so as to flow carrier gas through the column and sample through said collecting conduit, said timer being actuatable, after a timed period, to flow the carrier gas through said collecting conduit and thus displace the trapped sample into said column, said timer further being operable, during its cycle, to drive the recorder motor and short-circuit the recorder input terminals, means for feeding said second control impulses to said selector switch to cause the bank contacts to advance one step for each impulse, and an auxiliary timer connected to said bank contacts and actuated thereby to drive the chart motor and short-circuit the recorder input for a predetermined period after each energization thereof.

References Cited in the file of this patent

UNITED STATES PATENTS

| | | |
|---|---|---|
| 2,649,715 | Goble | Aug. 25, 1953 |
| 2,826,908 | Skarstrom | Mar. 18, 1958 |
| 2,875,606 | Robinson | Mar. 3, 1959 |

FOREIGN PATENTS

| | | |
|---|---|---|
| 571,003 | Great Britain | Aug. 1, 1945 |

OTHER REFERENCES

Gas Chromatography in Plant Streams, by D. Fuller in ISA Journal, November 1956, pages 440–444.

Gas Chromatography in Oil and Gas Journal, December 17, 1956, pages 126–140.